Oct. 21, 1930.  H. HARMS  1,779,233
STALK DIVIDER FOR MOWING MACHINES
Filed Sept. 11, 1928
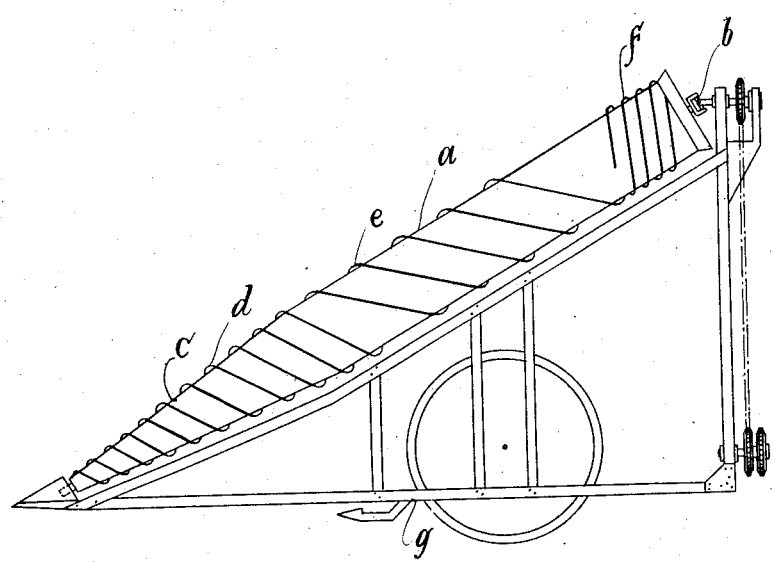
Inventor
Hinrich Harms
by
Attorney Patented Oct. 21, 1930

1,779,233

UNITED STATES PATENT OFFICE

HINRICH HARMS, OF EYSTRUP/WESER, GERMANY

STALK DIVIDER FOR MOWING MACHINES

Application filed September 11, 1928, Serial No. 305,243, and in Germany September 2, 1927.

I have filed an application in Germany on Sept. 2, 1927, and have obtained a patent in France No. 659,818, dated July 3, 1929.

This invention relates to improvements of the commonly used stalk dividers. Lifters for corn ears have become known, which consist of a conical body with a helical gathering rib, rotatable around the longitudinal axis and designed to convey the cut stalks to the table.

It has further been proposed to use cylindrical bodies for the same purpose.

According to the invention the rotary drum of the stalk divider is conical at its front end in advance of the sickle bar, and cylindrical from the sickle bar rearwardly, and it has a thin-walled helical rib of considerably greater pitch on the cylindrical portion than the helical rib on the conical portion. Owing to this arrangement the corn, which is lifted by the conical part of the drum, is delivered by the high pitch helical rib on the cylindrical portion in the proper position onto the table of the machine. The stalks which have slipped farther are then pushed back by a worm on the inner or rear end of the cylindrical portion, said worm having threads oppositely directed to that of the helical rib on the cylindrical portion so that also these stray stalks are delivered onto the table.

A further improvement consists in that the conical part of the drum has a helical rib starting with narrow (closely related) windings and getting wider towards the cylindrical portion and with gradually increasing pitch, wherefrom results that the stalks are at first gripped slowly and then conveyed to the cylindrical portion at a gradually increasing speed so that no clogging can occur.

An embodiment of the invention is illustrated, by way of example, in the accompanying drawing, the only figure of which shows the improved stalk divider in side elevation.

The rotary drum $a$ of the stalk divider is connected by a universal joint coupling $b$ to a chain gear arranged in the frame $g$ of the machine. On the conical point $c$ of the divider drum a lifting worm $d$ is arranged which is continued by a delivering worm $e$ of higher pitch. The lifting worm $e$ has at the point of the conical portion of the cylinder narrower windings enlarging in the direction towards the cylindrical portion and of gradually increasing pitch.

On the rear end of the cylindrical portion of the drum $a$ a worm $f$ is arranged which conveys the stalk, in a direction opposite to the direction in which the delivering worm $e$ conveys the same.

I claim:—

1. A stalk divider for mowing machines, comprising a rotary drum conical at the front end and cylindrical in rear thereof and having helical ribs of low pitch on the conical portion and of high pitch on the cylindrical portion, and driving means for the drum.

2. A stalk divider as specified in claim 1, in which the helical rib on the cylindrical portion is wider and has a considerably higher pitch than that on the conical portion of the drum.

3. A stalk divider as specified in claim 1, in which the helical rib on the cylindrical portion of the drum has a considerably higher pitch than that of the conical portion, and in which the rear end of the drum has threads extending reversely to the threads on the cylindrical portion of the drum.

4. A stalk divider as specified in claim 1, in which the worm on the conical portion of the drum has narrow threads getting wider in the direction towards the cylindrical portion and of gradually increasing pitch.

In testimony whereof I affix my signature.

HINRICH HARMS.